United States Patent [19]

Saito et al.

[11] Patent Number: 5,920,567
[45] Date of Patent: Jul. 6, 1999

[54] NETWORK RELATED INFORMATION TRANSFER METHOD FOR A CONNECTION DEVICE, AND A DATA COMMUNICATION SYSTEM

[75] Inventors: Shuichi Saito; Mikako Nanba; Makoto Nakamura, all of Hiratsuka, Japan

[73] Assignee: The Furukawa Electric Co., Ltd., Tokyo, Japan

[21] Appl. No.: 08/659,321

[22] Filed: Jun. 6, 1996

[30] Foreign Application Priority Data

Jun. 29, 1995 [JP] Japan .................................. 7-164312

[51] Int. Cl.⁶ .................................................. H04L 12/46
[52] U.S. Cl. ............................................ 370/404; 370/410
[58] Field of Search ..................................... 370/400, 401, 370/402, 403, 404, 408, 355, 410; 395/200.01, 200.15, 200.79, 200.8

[56] References Cited

U.S. PATENT DOCUMENTS

| | | |
|---|---|---|
| 5,166,931 | 11/1992 | Riddle ........................................ 370/401 |
| 5,331,634 | 7/1994 | Fischer ....................................... 370/405 |
| 5,426,637 | 6/1995 | Derby et al. ............................. 370/85.13 |
| 5,557,745 | 9/1996 | Perlman et al. ...................... 395/200.72 |
| 5,583,996 | 12/1996 | Tsuchiya ................................... 370/404 |
| 5,600,798 | 2/1997 | Cherukuri et al. ................. 395/200.13 |
| 5,644,713 | 7/1997 | Makishima .......................... 395/200.01 |

*Primary Examiner*—Min Jung
*Attorney, Agent, or Firm*—Frishauf, Holtz, Goodman, Langer & Chick

[57] ABSTRACT

A router is connected to a network having a terminal and also connected to other routers via an ISDN, and internetwork routing information retained by each router is transferred through the ISDN. In response to a routing information request from the terminal, the router establishes a connection with another router by means of an ISDN address in its first table. Then, the router receives, learns and retains the routing information transmitted from the other router, thus making it unnecessary to set all required routing information, and then sends the routing information to the network connected thereto.

1 Claim, 13 Drawing Sheets

FIG.4

| TARGET INDEX | ISDN ADDRESS |
|---|---|
| ROUTER B | 100 |
| ROUTER C | 200 |
| ⋮ | ⋮ |

FIG.5

| ZONE LIST | NETWORK NO. |
|---|---|
| ROUTER A | PROVISIONAL NETWORK NO. |
| ROUTER B | PROVISIONAL NETWORK NO. |
| ROUTER C | PROVISIONAL NETWORK NO. |
| ⋮ | ⋮ |

FIG.8

| INDEX | ISDN NO. |
|---|---|
| ROUTER B | 03—BBB |
| ROUTER C | 03—CCC |
| ROUTER F | 03—FFF |
| ¦ | ¦ |

FIG.9

| NETWORK NO. | ZONE LIST |
|---|---|
| x | ROUTER B |
|   | ROUTER C |
|   | ROUTER F |
|   | ¦ |

FIG.10

| NETWORK NO. | NEXT HOP ROUTER ADDRESS | INTERFACE | NUMBER OF HOPS |
|---|---|---|---|
| NETWORK 1 | 0 | LAN | 0 |
| NETWORK 3 | REMOTE ROUTER B | ISDN | 1 |
| NETWORK x | 0 | 0 | 0 |
| --- | --- | --- | --- |

FIG.14

| NETWORK NO. | ZONE LIST |
|---|---|
| y | ROUTER B |
|   | ROUTER C |
|   | ROUTER F |
|   | ⋮ |

FIG.15

| INDEX | ISDN NO. |
|---|---|
| ~~ROUTER B~~ | ~~03-BBB~~ |
| ROUTER C | 03-CCC |
| ROUTER F | 03-FFF |
| ⋮ | ⋮ |

FIG.16

| NETWORK NO. | ZONE LIST |
|---|---|
| z | ROUTER C<br>ROUTER F<br>\|<br>\|<br>\| |

NETWORK RELATED INFORMATION TRANSFER METHOD FOR A CONNECTION DEVICE, AND A DATA COMMUNICATION SYSTEM

BACKGROUND OF THE INVENTION

1. Field of the Invention

This invention relates to a network related information transfer method for a connection device such as a routing device (hereinafter referred to as "router") connected to a wide area network whereby network related information can be automatically learned and set, and to a data communication system capable of automatically and readily allocating virtual networks.

2. Description of the Related Art

Conventional routers of this type are connected to a wide area network (hereinafter referred to as "WAN") such as a public network (curcuit switching network) or an ISDN in which account is charged in proportion to the connect time or the quantity of data handled. A router performs call control whereby a line connection with a destination router is established when data is to be actually transferred between LANs and is cut off when there is no data to be transferred.

The call control performed by the router includes the following two functions:

According to the first call control function, the router establishes a line connection with a destination router upon receiving data which should be relayed (hereinafter referred to as "relay data") from a terminal connected to the same LAN. Also, in the case where no relay data is generated for a certain period of time, the router cuts off the line connection. To achieve this call control function, it is necessary that the router acquire the required path information (hereinafter referred to as "routing information" or "network related information") for data relay beforehand. To this end, the router is designed to retain statically set routing information or to dynamically learn the routing information.

According to the second call control function, the router performs a connecting/cut-off operation in accordance with a call control command from a data-originating terminal.

In the case where the routing information is statically set to achieve the first call control function, it is necessary that routing information be set with respect to all connectable networks when the router is installed or the system topology has been changed. Accordingly, the setting operation is complicated, possibly causing erroneous settings.

On the other hand, in the case where the routing information is dynamically learned, it is necessary that connections with all connectable routers should be once effected by a manual procedure when the router is installed or the system topology has been changed. This connection work consumes much labor.

In connection with the second call control function, the router requires a separate communication protocol for performing the connecting/cut-off operation.

SUMMARY OF THE INVENTION

This invention was created in view of the above circumstances, and an object thereof is to provide a connection device (router) which can learn routing information for data relay from other connection devices without setting all necessary routing information in the connection device.

The above object is achieved by a path information transfer method for a router and a data communication system according to this invention. A router is connected to a network having at least one terminal and is also connected via a WAN to at least one other router connected to another network. The router retains routing information, and inter-network routing information retained by each router is transferred by the path information transfer method.

Each router of this invention retains connection information for establishing a connection with each of other routers through the WAN. According to the path information transfer method, on receiving from the terminal a request to acquire network-related information (e.g., zone, service and name) retained by another predetermined router, the router establishes a connection with the predetermined router through the WAN in accordance with the connection information retained thereby. The router then receives and retains the routing information transmitted from the predetermined router. Thus, it is not necessary to set all required routing information in the router at the time of installation etc.; instead, the router makes a call to a destination router by using the connection information and thus can learn routing information in an error free manner. The router establishes a connection in accordance with the learned routing information and then transmits relay data from the terminal to the destination network.

Also, in the path information transfer method, the router sends the routing information acquired from the predetermined router to the network connected thereto (i.e., the network to which the request-originating terminal is connected). Therefore, in the case where another router is connected to this network, for example, this router also can learn the routing information.

Further, according to the path information transfer method, call control information such as call control zones for controlling calls to other routers is defined. In the case where a connection with another network is to be established, a packet including the call control information is generated, and a connection with the corresponding router is established upon receipt of the call control information to thereby transfer routing information between the routers.

Also, in the path information transfer method, a packet including a call control zone is generated, and a predetermined router establishes a connection upon receiving the packet, whereby all required routing information for data relay can be learned and supplied to the network.

A virtual network or the like which is created for the call control is assigned an unused network number. In order to avoid conflict of network numbers, however, the administrator must take care of the allocation of network numbers, and the setting operation involved consumes much labor and time. Also when a network number once allocated need be changed, the administrator must reset the allocation, similarly consuming labor and time.

Another object of this invention is to provide a data communication system capable of automatically and readily allocating virtual networks.

The data communication system includes routers connected to respective networks, and these routers are connected to one another via a wide area network. In the data communication system according to this invention, when creating call control information, a router searches the routing information retained thereby for a provisional network number which is not used in the system, and automatically allocates the provisional network number to a predetermined network.

Also, in this data communication system, where an identical network number is allocated to a plurality of networks, a router automatically allocates a provisional network number, which is not used in the system, to one of the networks which permits a change of the network number thereof.

In the data communication system, moreover, when information specific to a network has been modified, a router automatically replaces the network number allocated to this network with a provisional network number which is not used in the system, and then transmits the thus-modified information to the other networks.

BRIEF DESCRIPTION OF THE DRAWINGS

FIG. 4 is a chart showing, by way of example, the arrangement of a first table stored in a router in FIG. 1;

FIG. 5 is a chart showing an example of the arrangement of a second table similarly stored in the router;

FIG. 8 is a chart showing another example of the arrangement of the first table (index list);

FIG. 9 is a chart showing another example of the arrangement of the second table (call control table);

FIG. 10 is a chart showing the arrangement of a routing table stored in a router in FIG. 7;

FIG. 14 is a chart showing the arrangement of the call control table after change of a network number;

FIG. 15 is a chart showing, by way of example, the arrangement of the index list after modification; and FIG. 16 is a chart showing another example of the arrangement of the call control table after change of a network number.

DETAILED DESCRIPTION OF THE PREFERRED EMBODIMENTS

A path information transfer method for a connection device and a data communication system according to this invention will be hereinafter described with reference to FIGS. 1 through 16.

Figure 1:
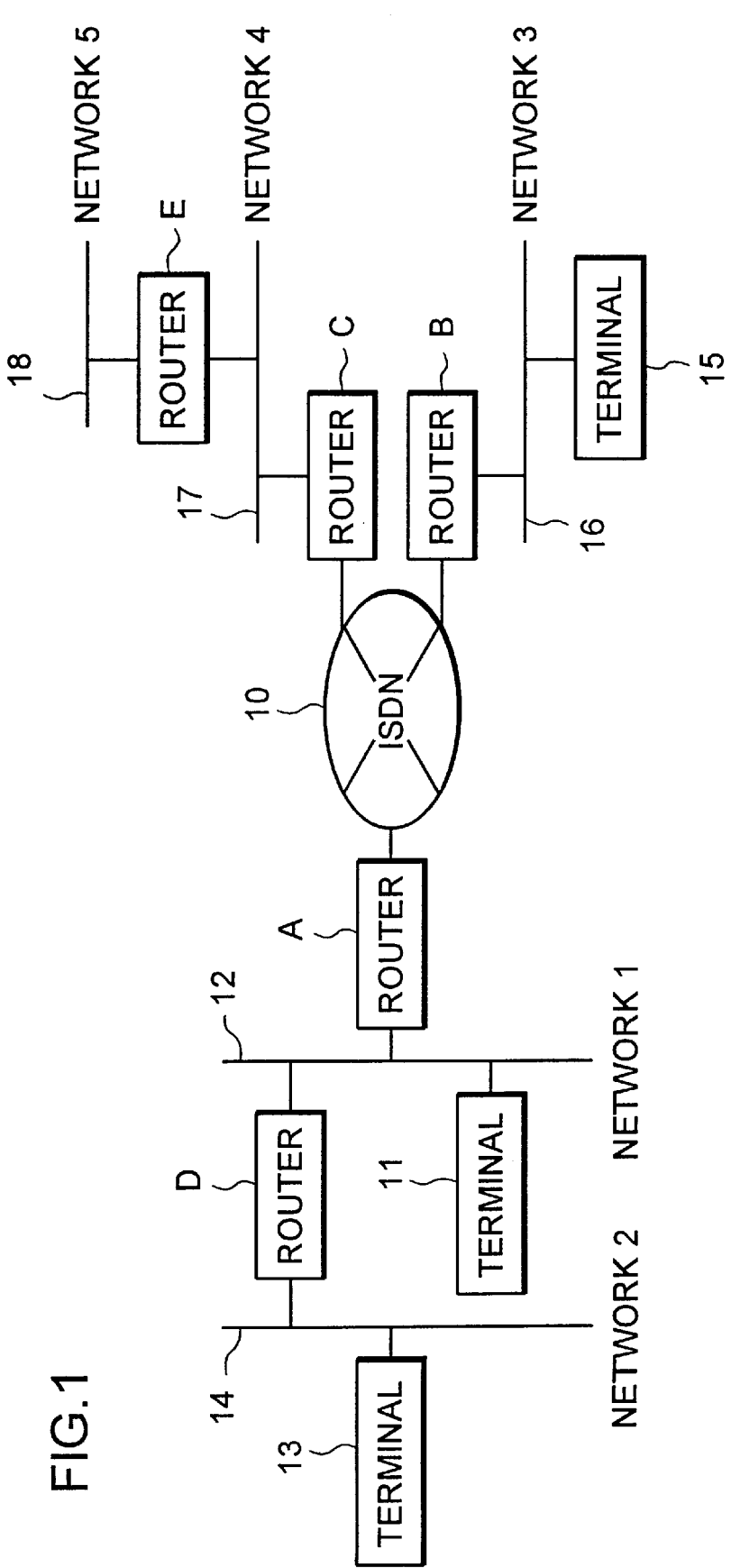
FIG. 1 is a block diagram showing, by way of example, the configuration of a data communication system using a path information transfer method according to this invention.

FIG. 1 illustrates, by way of example, the configuration of a data communication system using a path information transfer method according to this invention. In the illustrated embodiment, routers A to C are directly connected to networks 1, 3 and 4, respectively, and at the same time are connected to other networks through an ISDN 10. The other networks, in this case, indicate the networks (1, 3, 4) other than those to which the individual routers are directly connected.

As shown in FIG. 1, the network 1 comprises routers A and D, a terminal 11, and a transmission line 12 connecting the routers A and D and the terminal 11. A network 2 comprises the router D, a terminal 13, and a transmission line 14 connecting the router D and the terminal 13. The network 2 is connected to the network 1 via the router D. The network 3 comprises the router B, a terminal 15, and a transmission line 16 connecting the router B and the terminal 15. The network 4 comprises routers C and E, and a transmission line 17 connecting the routers C and E. A network 5 comprises the router E and a transmission line 18 connected to the router E. This network 5 is connected to the network 4 via the router E.

The networks 1 and 2, the network 3, and the networks 4 and 5 constitute LANs, respectively.

Figure 2:
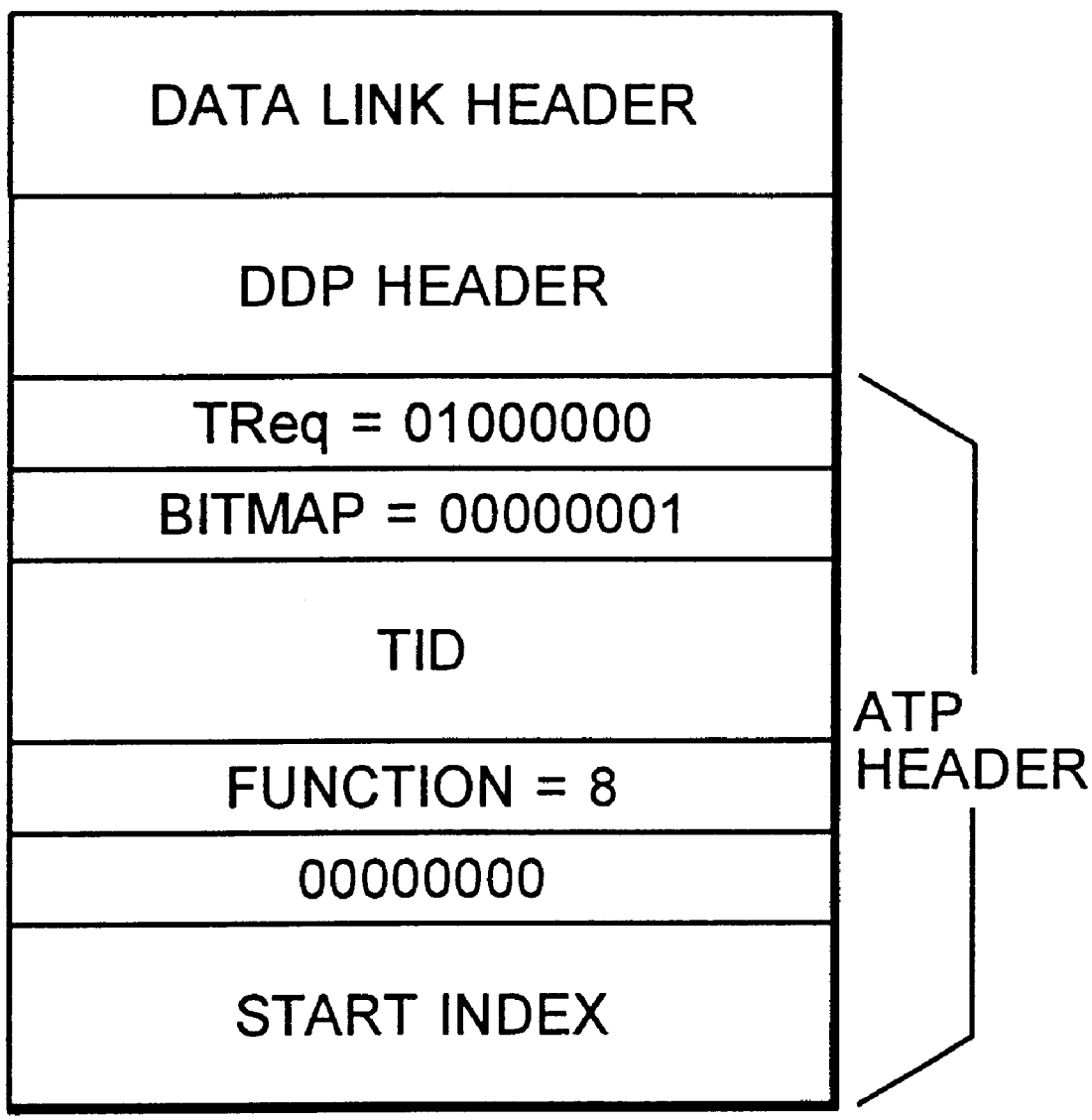
FIG. 2 is a chart showing the format of a Get Zone List packet transferred in the system of FIG. 1.

Each of the terminals 11, 13 and 15 performs packet-based data communications according to a predetermined communication protocol, for example, AppleTalk Transaction Protocol (hereinafter referred to as "ATP"). When accessing a network which does not have routing information stored therein, for example, the terminal 11, 13 or 15 sends a Get Zone List packet, which is a kind of ATP packet as shown in FIG. 2, to the router A, D or B on the same LAN to get a call control information. Also, on receiving a Get Zone List Reply packet, mentioned later with reference to FIG. 6, from the router on the same LAN, the terminal 11, 13 or 15 sends the router a Name Binding Protocol (hereinafter referred to as "NBP") packet including a call control zone, as shown in FIG. 3.

As shown in FIG. 2, the Get Zone List packet consists of a Data Link Header indicating a physical protocol used (in the embodiment, Ethernet), a DDP (Datagram Delivery Protocol) Header specifying a packet forward process to be used in the router, and an ATP Header.

Among these headers, the ATP Header includes a TReq (Transaction Request), a Bitmap, a TID (Transaction Identifier), a Function, a Field Area, and a start Index. The TReq indicates an ATP type (in the embodiment, the request "01000000"), and the Bitmap indicates the number of response packets (in the embodiment, the fLxed value "00000001"). The TID indicates an identifier of the ATP packet, and the Function indicates a kind of packet using ATP (in the embodiment, "Get Zone List"). The Field Area indicates "00000000", and the Start Index stores the first index of a zone to be requested.

Figure 3:
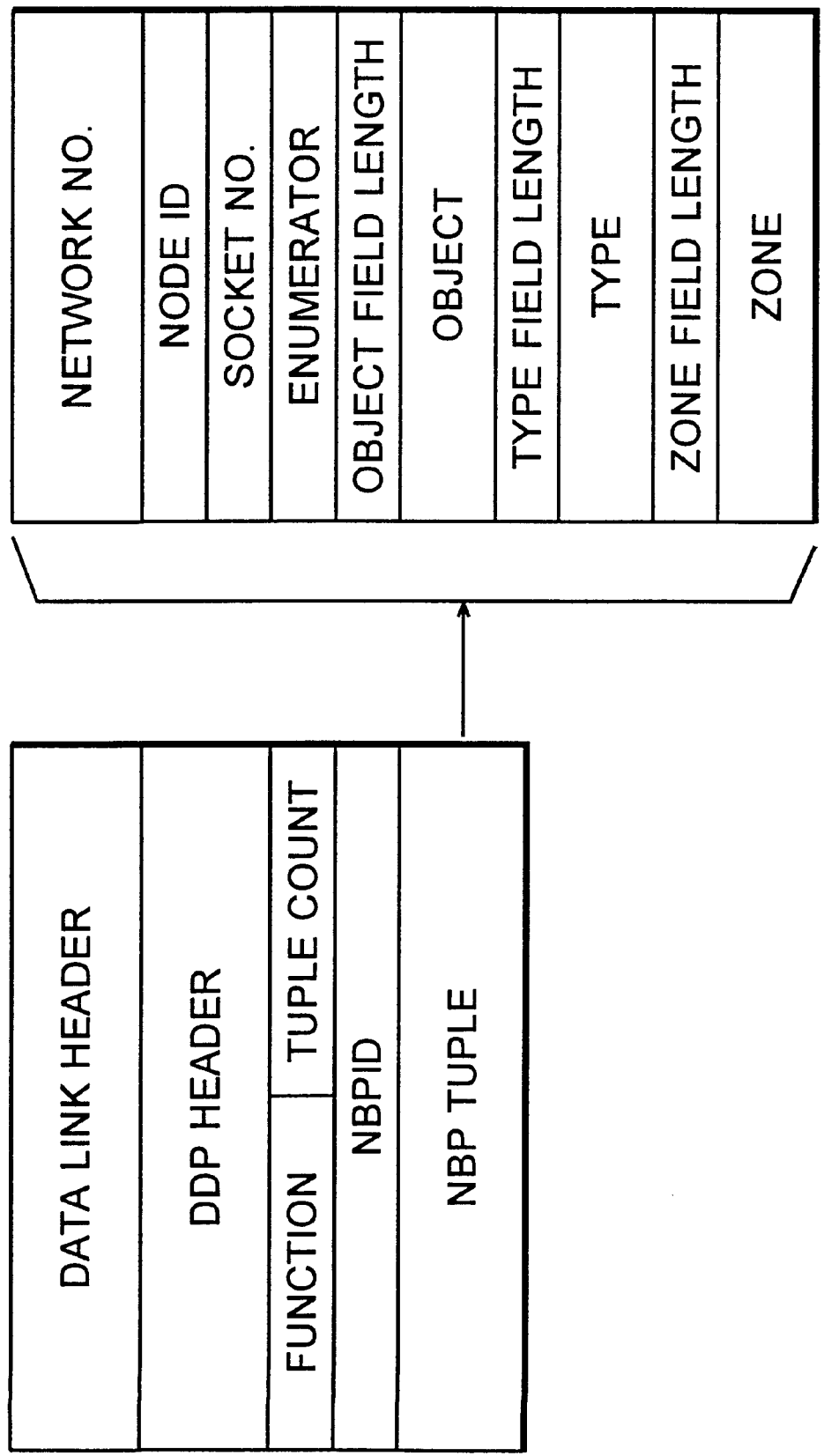
FIG. 3 is a chart similarly showing the format of an NBP packet.

As shown in FIG. 3, the NBP packet consists of the Data Link Header, the DDP Header, a Function, a Tuple Counter, an NBPID, and an NBP Tuple.

In this structure, the Function indicates an NBP type (in the embodiment, the request "1"). The Tuple Counter indicates the number of tuples in the NBP packet (in the embodiment, "1"), and the NBPID indicates an identifier of the NBP packet. The NBP Tuple comprises a Network number, a Node ID, a Socket number, an Enumerator, an Object field length, an Object, a Type field length, a Type, a Zone field length, andt a Zone.

The Network number, the Node ID, and the Socket number indicate the network address, node identifier and socket number of the source terminal, respectively. The Enumerator serves to distinguish the tuples in. the packet from each other. The Object field length, the Object, the Type field length and the Type indicate, respectively, the number of characters of the object (e.g., the number of characters is "4" in the case where the object is "ABCD"), the object name, the number of characters of a type and the type. The Zone field length and the Zone respectively indicate the number of characters of a zone to be located (e.g., the number of characters of a district name in the case where the zone represents a district), and the zone name.

The router A is provided with a first table storing target index information and ISDN address information, as shown in FIG. 4. The target index information is information about destination routers with respect to which connection is to be established through the ISDN 10, in this embodiment, the routers B, C, for example. The ISDN address information is information about addresses in the ISDN set corresponding to the respective target indexes. In the embodiment, the address information is telephone numbers indicated by "100", "200", . . . , for example.

Also, the router A is provided with a second table storing zone list information and network numbers, as shown in FIG. 5. The zone list information is information necessary to transfer data from the source terminal, for example, preset information about the district or zone in which the LAN is constituted. In this embodiment, individual routers are specified as the target indexes. The network numbers indicate provisional numbers for the networks present in respective zones. In the illustrated embodiment are shown a provisional network number for the networks 1 and 2 associated with the router A in the zone list, a provisional network number for the network 3 associated with the router B, and a provisional network number for the networks 4 and 5 associated with the router C.

Figure 6:
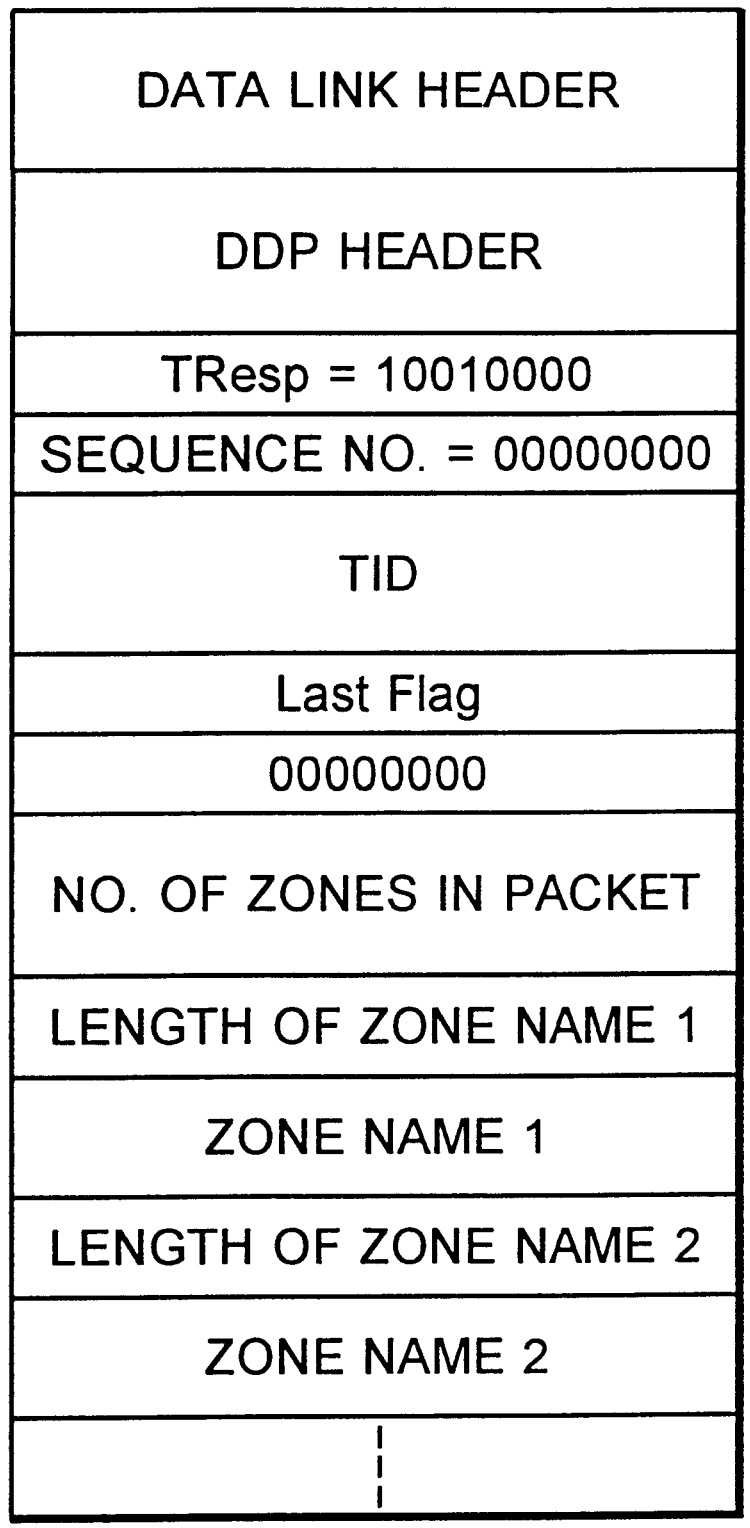
FIG. 6 is a chart showing the format of a. Get Zone List Reply packet transferred in the system of FIG. 1.

The target index information shown in FIG. 4 has the same contents as the zone list information shown in FIG. 5. The routers B and C shown in FIG. 1 also are each provided with the first and second tables. Based on the information in the first and second tables, each of the routers A to C carries out transmission/reception of routing information and transfer of data. On receiving a Get Zone List packet (see FIG. 2) from the terminal on the same LAN, the router A, B, C sends a Get Zone List Reply packet, which is a kind of ATP packet as shown in FIG. 6, to the terminal associated therewith Also, upon receiving an NBP packet (see FIG. 3) from the terminal 11, 13, 15, the router A, B, C searches for the zone in the NBP packet to identify a target index (destination router). Then, based on the ISDN address in the first table, the router establishes a connection with the destination router. Subsequently, the router A,B,C receives routing information from the destination router, learns the contents thereof, and sends the information to the network(s) belonging to the same LAN.

As shown in FIG. 6, the Get Zone List Reply packet consists of the Data Link Header, the DDP Heaider, a TResp (Transaction Response), a Sequence Number (in this embodiment, "00000000"), the TID, a Last Flag, a Field Area of "00000000", a Number of zones, Lengths of zone names, and Zone names.

In this packet structure, the TResp indicates an ATP type, in this embodiment, the response "10010000". The Last Flag indicates whether this packet is the last Get Zone List Reply packet, and the Number of zones indicates the number of zones included in this packet. The Length of zone name indicates the length of a zone name in the packet, and the Zone name indicates a zone name.

The router D serves to transfer various packets of data between the networks 1 and 2 while the router E serves to transfer various packets of data between the networks 4 and 5, and both of these routers D and E have the table shown in FIG. 5. The router D, when supplied with routing information from the router A, learns the contents of the information. Similarly, when supplied with routing information from the router C, the router E learns the contents of the information.

The following explains how routing information is transferred in the data communication system shown in FIG. 1. In the following, it is assumed that the terminal 11 requests routing information and that routing information is transferred between the routers A and B.

First, in order to request an AppleTalk Zone List, the terminal 11 sends a Get Zone List packet (see FIG. 2) to the router A through the transmission line 12.

On receiving the Get Zone List packet, the router A operates in response to the Zone List request; namely, it sends the terminal 11 a Get Zone List Reply packet (see FIG. 6) in which are included the target indexes (router B, router C, . . . ) of the first table (FIG. 4) as call control zones.

The terminal 11, which is thus supplied with the Get Zone List Reply packet, recognizes the call control target indexes as one of zones. Where data communication is to be established with respect to the terminal 15 on the network 3, the terminal 11 specifies the router B in the call control zone of an NBP packet (see FIG. 3) and sends this NBP packet to the router A.

On receiving the NBP packet, the router A searches the first table for an ISDN address corresponding to the router B, in accordance with the zone in the NBP packet, and establishes a line connection with the roiter B. After the connection is established through the ISDN, the router A requests routing information from the router B.

In response to the request, the router B assembles the routing information (network address information, zone information) retained thereby into a packet and transmits the packet to the router A. On receiving the routing information, the router A learns the contents thereof and sends the information to the network 1 on the same LAN.

The routing information includes the set network numbers, gateway addresses, zone information, etc. This routing information is also supplied to the router D which serves to transfer data between the networks. The router D learns the contents of the routing information, thereby acquiring new network address information and zone information.

Thus, in this embodiment, each router connected to a WAN retains call control ISDN address information in respect of each of destination routers connected via the WAN. A terminal on a LAN sends the call control information to a call control router, which then establishes a line connection via the ISDN in accordance with the call control information and acquires routing information from a destination router. Accordingly, when the router is installed, for example, it is not necessary to set all required routing information in the router; instead, a call is made using the set ISDN address information, whereby the routing information can be learned error free. Subsequently, based on the learned routing information, the call control router establishes a line connection so that relay data from the terminal can be transmitted to the destination network.

Also, in this embodiment, the router sends the routing information, which has been received from a destination router, to its own network. Accordingly, in the case where another router is connected to this network, this router also can receive the routing information and learn the contents thereof.

The following is a description of how a router automatically allocates a provisional network number for call control.

Figure 7:
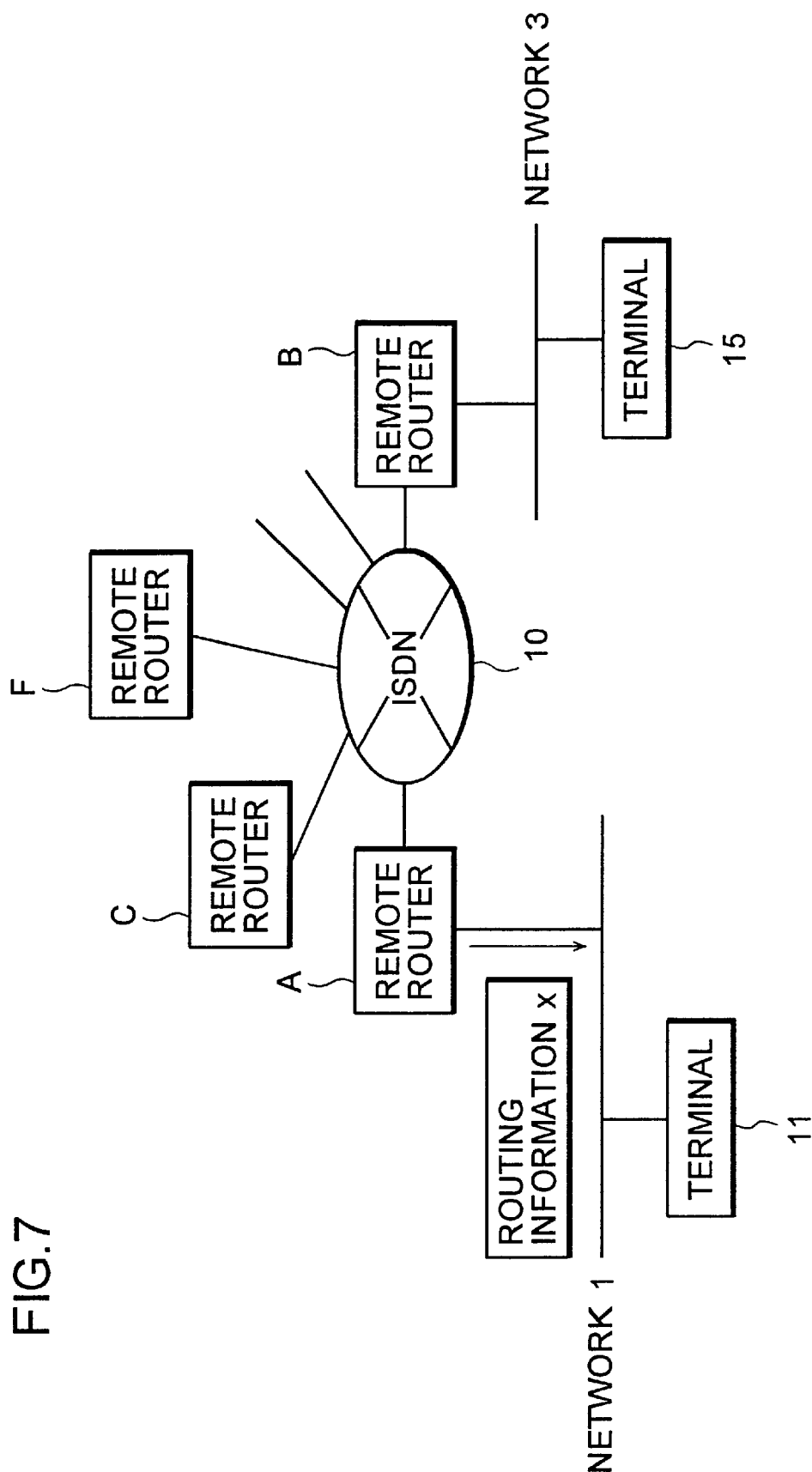
FIG. 7 is a block diagram showing, by way of example, another configuration of a data communication system according to this invention.

FIG. 7 is a block diagram illustrating the configuration of another data communication system according to this invention. In the data communication system shown in FIG. 7, remote LANs are connected to one another through an ISDN 10 by means of inter-LAN connection devices (hereinafter referred to as "remote routers") A to C and F for carrying out packet-based data communications according to ATP.

The remote routers A to C and F each have an index list and a call control table shown in FIGS. 8 and 9, respectively. The index lists and call control tables of the individual remote routers have respective identical arrangements; therefore, only those retained by the remote router A will be explained.

The index list has an arrangement similar to that of the first table (see FIG. 4). Specifically, the index list of this embodiment stores target index information indicating destination remote routers (e.g., remote routers B, C, F, . . . ), and ISDN address information (e.g., telephone number information "03-BBB", "03-CCC", "03-FFF", . . . ) set corresponding to the respective target indexes.

Also, the call control table has an arrangement similar to that of the second table (see FIG. 5). Specifically, the call control table of this embodiment stores a provisional network number (e.g., provisional network number x) for the networks present in the zone, and zone list information (e.g., individual target indexes as remote routers) associated with the provisional network number. In this embodiment, the call control table retains zone list information about all remote routers B, C, F, . . . within the system in association with one provisional network number x. This invention, however, is not limited to this data format; for example, the remote routers may be divided into a plurality of groups according to districts or zones so that different provisional network numbers may be set for the respective groups. Also, according to this invention, different provisional network numbers may be set for the respective remote routers.

Each remote router has a routing table as shown in FIG. 10, in addition to the aforementioned list and table. Also in this case, the table retained by the remote router A will be explained.

As shown in FIG. 10, the routing table comprises a Network Number indicating a network number present in the system, a Next Hop Router Address, an Interface specifying LAN or ISDN, and a Number of Hops indicative of the number of the packet addressed the network traverses routers.

In this embodiment, the Network Number indicates the number of the network 1, the number of the network 3, the number of the provisional network x, etc. The Next Hop Router Address indicates "0" for the network 1, the address of the remote router B for the network 3, "0" for the network x, etc. The Interface specifies "LAN" for the network 1, "ISDN" for the network 3, "0" for the provisional network x, etc. The Number of Hops indicates "0" for the network 1, "1" for the network 3, "0" for the provisional network x, etc.

Referring now to the flowchart of FIG. 11, how the remote router A allocates a provisional network number for call control will be described.

Figure 11:
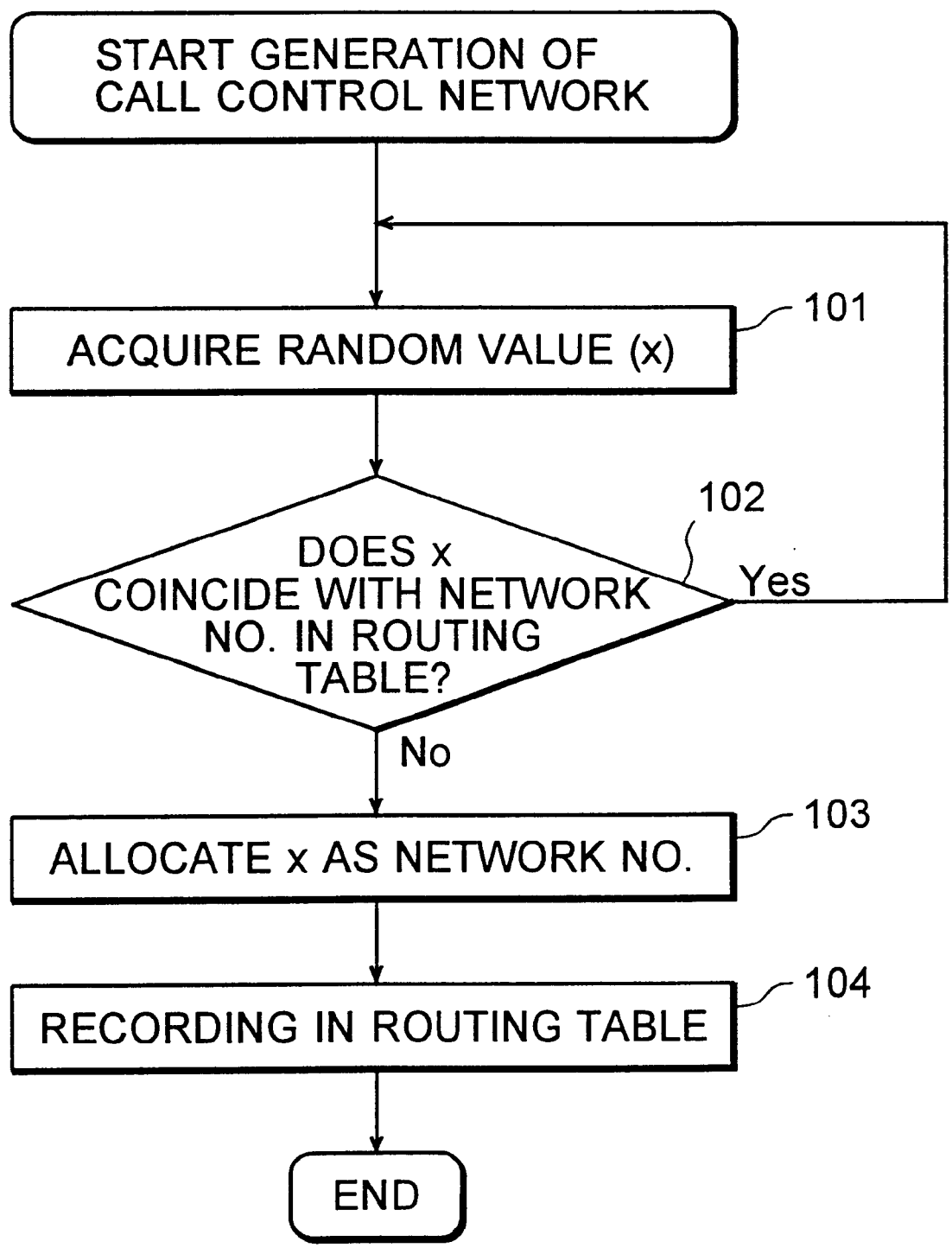
FIG. 11 is a flowchart illustrating how a remote router allocates a provisional network number for call control.

In the case of generating a provisional network number for call control after start, the remote router A first acquires a random value (x) (Step 101), as shown in FIG. 11. The random value may be obtained by using a table of random numbers, for example. It is then determined whether or not the value x has already been recorded in the routing table shown in FIG. 10 (Step 102).

If the value x falls within the range of network numbers recorded in the routing table, the flow returns to Step 101 and a random value is acquired again, followed by the same process as aforesaid. On the other hand, if the value x is outside the range of network numbers recorded in the routing table, the remote router A allocates x in the call control table as a network number (Step 103), as shown in FIG. 9. Also, the remote router A records x in the routing table (Step 104), as shown in FIG. 10. In the routing table, "0" is set for each of the Next Hop Router Address, Interface, and the Number of Hops which are associated with the network number x so that the recorded network number can be identified as a provisional network number.

Thus, in this embodiment, a network number is acquired at random and, if not recorded in the system, is allocated in the call control table as a provisional network number. Accordingly, in the case where the embodiment is applied to a network which permits allocation of any network numbers other than the used numbers, network numbers which are not recorded in the network system can be automatically allocated at any time. According to this embodiment, therefore, it is not necessary for the network administrator to perform setting operation.

Further, in the call control table of this embodiment, a single provisional network number x is allocated to zone list information covering all remote routers B, C, F, . . . in the system. Therefore, network numbers used for the allocation can be minimized and also routing information recorded in the routing table can be reduced.

Referring now to the flowchart of FIG. 12 and the diagram of FIG. 13, how a provisional network number is allocated when the remote router A receives new routing information will be explained.

Figure 12:
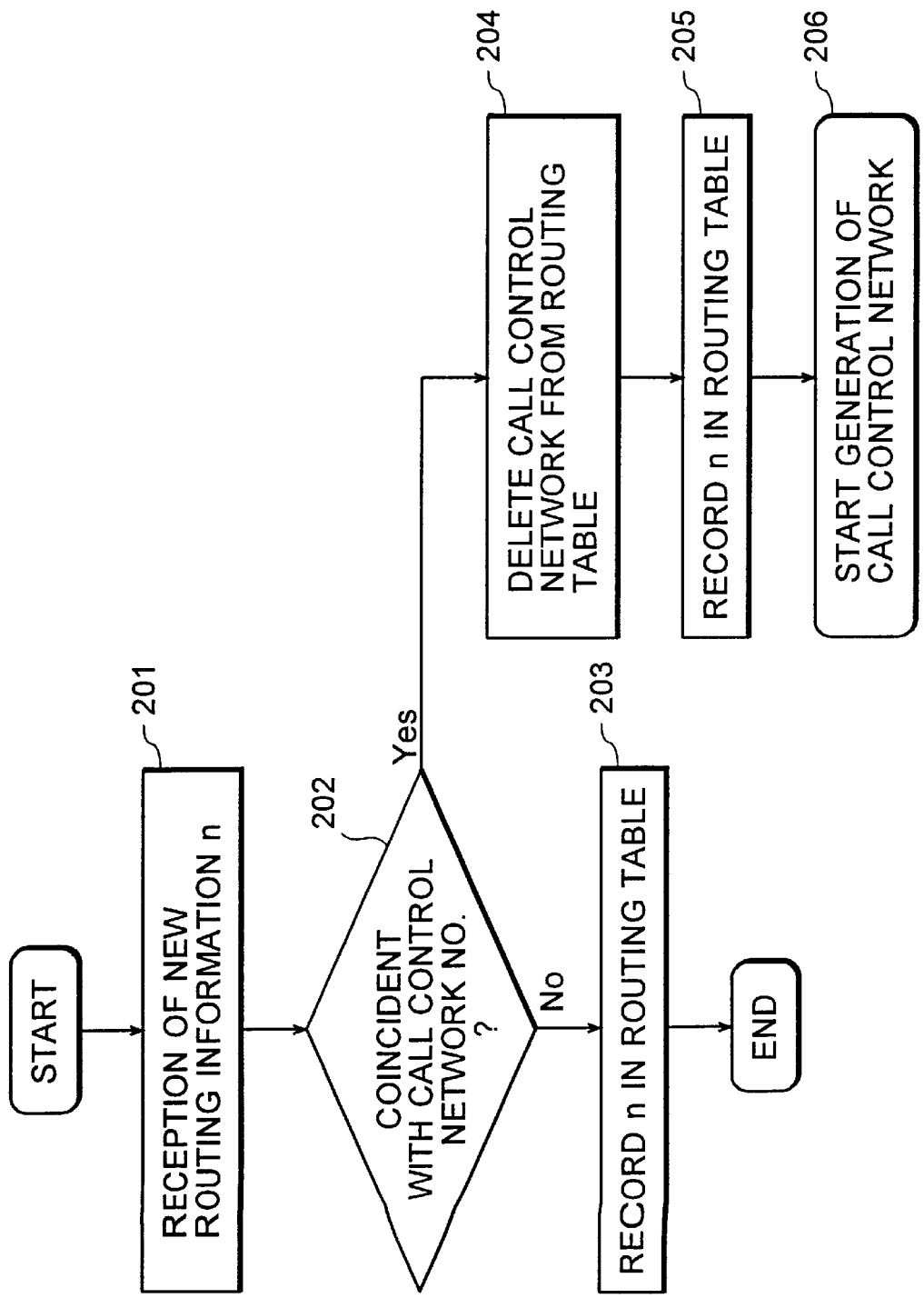
FIG. 12 is a flowchart illustrating how a remote router allocates a provisional network number on receiving new routing information.
Figure 13:
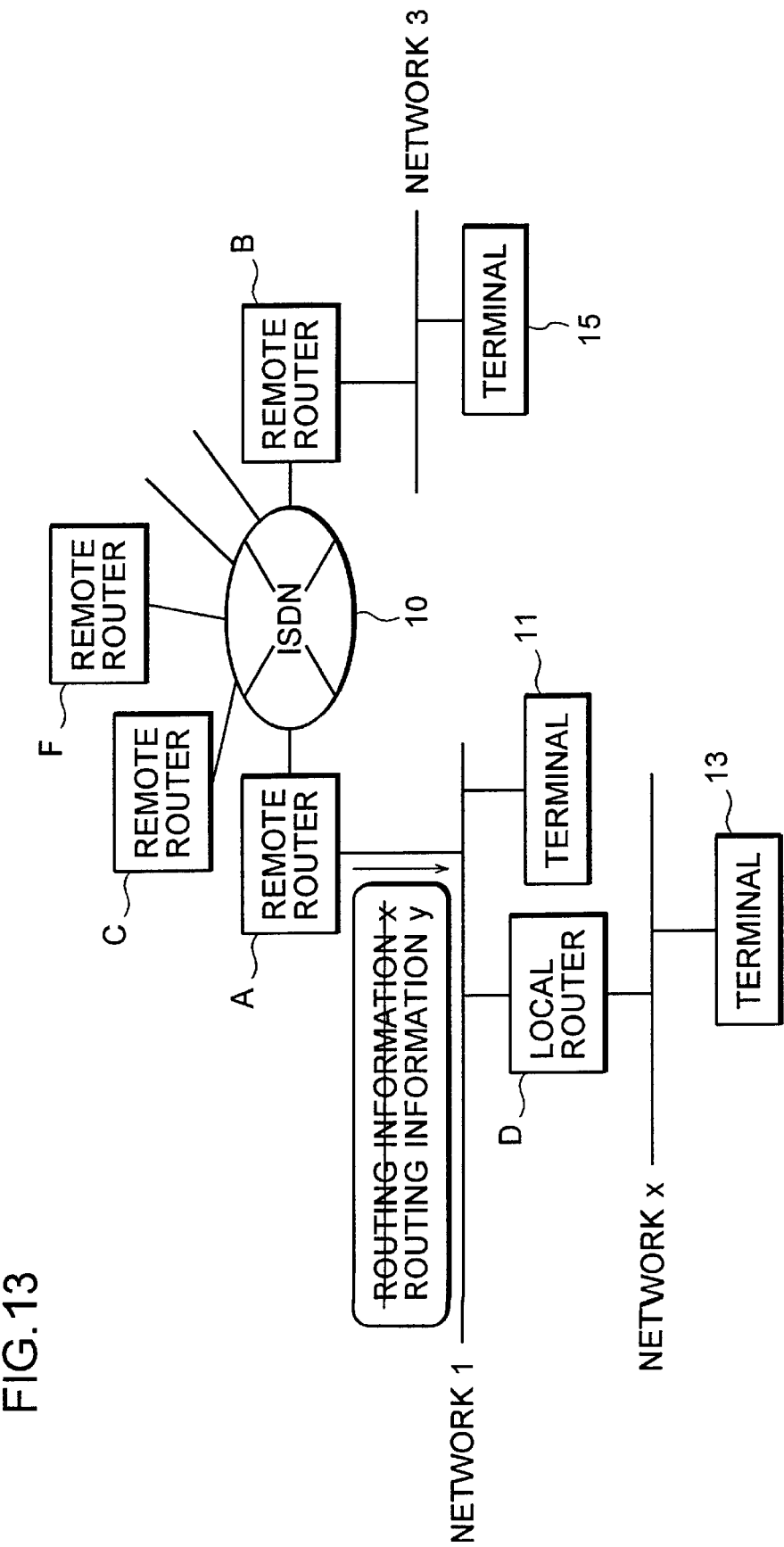
FIG. 13 is a block diagram showing still another example of the configuration of a data communication system according to this invention.

When the remote router A is connected to a new network x via a local router D, as shown in FIG. 13, or when a line connection is established through the ISDN 10, for example, the remote router A receives new routing information n (Step 201 in FIG. 12). The local router D is so named, as opposed to remote router, because it does not have the aforementioned function of automatically allocating a provisional network number.

The remote router A then determines whether or not the network number in the new routing informaition n coincides with the network number in the preset call control table (Step 202).

If the network number in the routing information n does not coincide with the network number in the call control table, the remote router A records the new routing information n in its own routing table (Step 203). On the other hand, if the network number x in the routing information n coincides with the network number (x) in the call control table (see FIG. 9), the remote router A deletes the provisional network information (information associated with the provisional network number x) from its routing table (see FIG. 10) (Step 204). The remote router A then records the newly received routing information n in its routing table (Step 205). The routing information n, in the case of this embodiment, is routing information including the network number x of the new network.

Subsequently, the remote router A executes the routine for generating a provisional network for call control, shown in FIG. 11, to carry out allocation of a provisional network number (Step 206). Specifically, the remote router A replaces the network number x in the call control table with a new provisional network number, for example, a network number y, as shown in FIG. 14.

Accordingly, in this embodiment, a new provisional network number can be allocated and recorded in the call control table as well as in the routing table. Thus, when the router receives routing information from a network of which the network number is once registered in the call control table, it can record the received information as new routing information, without discarding the received information, and it is possible to always allocate in the call control table a network number which actually does not exist in the system.

The following is a description of how information specific to a network is modified.

In the call control table is allocated call control information such as a zone list indicating destinations of connection via the ISDN, in addition to the network numbers. These items of information are transmitted in like manner when the routing information is transmitted to another networks, and once they are transmitted, the initially set information remains as it is unless the routing information is deleted. Therefore, in the case where the list of destinations to be connected via the ISDN is modified but the routing information remains unchanged, the modified information is not transmitted to other networks.

According to this embodiment, when the index list is modified (for example, when the router B is deleted from the list) as shown in FIG. 15, the remote router A searches the routing information indicative of the network x and removes it.

Subsequently, the remote router A searches for a network number which is not used in the routing table, and then creates a call control table by automatically allocating a new network number, for example, a network number z as shown in FIG. 16, and thereby modifying the zone list. Further, when the routing information is modified, the remote router A transmits the modified routing information to other networks.

In the case of transmitting the routing information to destinations connected via the ISDN, the settings may preferably be made beforehand so that the routing information about a virtual network may not be transmitted. This advantageously reduces the routing information recorded in the routing table on the part of each destination. In this embodiment is described the case where a router is deleted from the list; where a router is added to the list, the call control table is automatically created and new routing information is transmitted in like manner.

Thus, in this embodiment, when information specific to a network is modified, a virtual network can be automatically allocated, and also the modified information can be automatically transmitted to other networks. Namely, according to this embodiment, when the list of routers is modified, the call control table is automatically created and the modified routing information is transmitted to other networks, whereby the old routing information and old call control information of the other networks are deleted and the new routing information and new call control information can be automatically recorded in these networks.

What is claimed is:

1. A network related information transfer method in a system including a wide area network, a first connection device to which a terminal is connected not via said wide area network, and a second connection device connected via said wide area network to said first connection device, for transferring network related information retained by said second connection device to said terminal, wherein:

said first connection device has call control information for establishing a connection with said second connection device through said wide area network, said first connection device sends indices for said call control information in response to a request for network related information sent from said terminal, said terminal picks from said indices an index corresponding to desired call control information, stores said index in a request packet for accessing said second connection device and sends out said request packet in accordance with a communication protocol, said first connection device judges, on receipt of said request packet, that said second connection device is a communication party of said first connection device, and performs a call control operation for calling said second connection device based on said desired call control information, said first connection device obtains, when a call is established between said first connection device and said second connection device, network related information retained by said second connection device, and said first connection device sends the network related information obtained from said second connection device to a network to which said first connection device is connected.

* * * * *